(12) United States Patent
Sjostrom

(10) Patent No.: US 10,997,379 B2
(45) Date of Patent: May 4, 2021

(54) METHOD AND SYSTEM TO IDENTIFY COAL CHARACTERISTICS AT THE MINE

(71) Applicant: ADA-ES, INC., Highlands Ranch, CO (US)

(72) Inventor: Sharon Sjostrom, Sedalia, CO (US)

(73) Assignee: ADA-ES, Inc., Highlands Ranch, CO (US)

( * ) Notice: Subject to any disclaimer, the term of this patent is extended or adjusted under 35 U.S.C. 154(b) by 0 days.

(21) Appl. No.: 16/750,898

(22) Filed: Jan. 23, 2020

(65) Prior Publication Data

US 2020/0160003 A1    May 21, 2020

Related U.S. Application Data

(63) Continuation of application No. 16/228,088, filed on Dec. 20, 2018, now Pat. No. 10,599,889, which is a continuation of application No. 15/262,933, filed on Sep. 12, 2016, now Pat. No. 10,162,991.

(60) Provisional application No. 62/216,878, filed on Sep. 10, 2015.

(51) Int. Cl.
*G06K 7/10* (2006.01)
*C10L 5/34* (2006.01)

(52) U.S. Cl.
CPC ............ *G06K 7/10297* (2013.01); *C10L 5/34* (2013.01); *C10L 2230/14* (2013.01); *C10L 2230/16* (2013.01); *C10L 2270/04* (2013.01)

(58) Field of Classification Search
CPC .... G06K 7/10297; C10L 5/34; C10L 2230/14; C10L 2230/16; C10L 2270/04
See application file for complete search history.

(56) References Cited

U.S. PATENT DOCUMENTS

| | | | |
|---|---|---|---|
| 4,979,447 | A | 12/1990 | Farrar |
| 5,541,848 | A | 7/1996 | McCormack |
| 5,616,296 | A | 4/1997 | Hittner et al. |
| 10,162,991 | B2 | 12/2018 | Sjostrom |
| 2005/0040222 | A1 | 2/2005 | Robinson |
| 2007/0229269 | A1 | 10/2007 | Morris |
| 2007/0295590 | A1 | 12/2007 | Weinberg et al. |
| 2009/0214992 | A1 | 8/2009 | McKnight et al. |
| 2009/0266891 | A1 | 10/2009 | Santucci et al. |
| 2009/0272028 | A1 | 11/2009 | Drozd |
| 2013/0087709 | A1 | 4/2013 | Visbal et al. |
| 2013/0276682 | A1 | 10/2013 | Durham et al. |
| 2019/0130142 | A1 | 5/2019 | Sjostrom |

OTHER PUBLICATIONS

Niksa et al., "Predicting Mercury Specification in Coal-Derived Flue Gases," Prepr. Pap.-Am. Chem. Soc., Div. Fuel Chem., 2003, vol. 48(2), pp. 768-773.
International Search Report and Written Opinion for International (PCT) Patent Application No. PCT/US2016/051307, dated Jan. 19, 2017, 9 pages.

(Continued)

*Primary Examiner* — Laura A Gudorf
(74) *Attorney, Agent, or Firm* — Sheridan Ross P.C.

(57) ABSTRACT

A composition is provided that includes a carbonaceous feed material to be combusted to generate an off-gas and an identifier. The identifier is associated with a predetermined composition, characteristic or property of the feed material or the off-gas.

24 Claims, 3 Drawing Sheets

(56) References Cited

OTHER PUBLICATIONS

International Preliminary Report on Patentability for International (PCT) Patent Application No. PCT/US2016/051307, dated Mar. 22, 2018 6 pages.
Official Action for U.S. Appl. No. 15/262,933, dated Nov. 15, 2016, 13 pages.
Official Action for U.S. Appl. No. 15/262,933, dated Jul. 14, 2017, 16 pages.
Official Action for U.S. Appl. No. 15/262,933, dated Jan. 26, 2018 12 pages.
Notice of Allowance for U.S. Appl. No. 15/262,933, dated Aug. 24, 2018 12 pages.
Official Action for U.S. Appl. No. 16/228,088, dated Feb. 8, 2019 10 pages.
Final Action for U.S. Appl. No. 16/228,088, dated Aug. 8, 2019 11 pages.
Notice of Allowance for U.S. Appl. No. 16/228,088, dated Oct. 23, 2019 9 pages.

METHOD AND SYSTEM TO IDENTIFY COAL CHARACTERISTICS AT THE MINE

REFERENCE TO RELATED APPLICATION

The present application is a continuation of U.S. patent application Ser. No. 16/228,088 filed on Dec. 20, 2018 which is a continuation of U.S. patent application Ser. No. 15/262,933, filed Sep. 12, 2016, now U.S. Pat. No. 10,162,991, which claims the benefit of U.S. Provisional Application Ser. No. 62/216,878, filed Sep. 10, 2015, which is incorporated herein by this reference in its entirety.

FIELD

The disclosure relates generally to coal-fired power plants and particularly to selecting the coal feed to the power plant.

BACKGROUND

Increasingly stringent pollution control standards for acid gases and trace air toxics, including hydrochloric acid (HCl), sulfur trioxide ($SO_3$), and mercury (Hg), pose greater challenges for industries. Current best control practices for sorbent pollution control processes, such as activated carbon injection (ACI) and dry sorbent injection (DSI), must be improved. In many cases, a further increase in sorbent injection rate is uneconomical, ineffective, and/or otherwise adversely impacts the waste gas treatment process.

The operational performance of a coal fired power plant and contaminant emission levels is dependent on the type of coal the plant burns. It is well known that discrete coal seams have different qualities and composition. However, even within a coal seam, variability of certain characteristics (without limitation: heating value, mercury, sulfur, chlorine or other halogens, etc.) can be large enough to have a measureable impact on plant performance and contaminate emissions.

In attempting to optimize plant performance, predictive technologies can be utilized to estimate desired parameters, such as mercury or other emissions, or heat rate. Variability in the coal source imposes performance limitations on predictive technologies.

SUMMARY

These and other needs are addressed by the various aspects, embodiments, and configurations of the present disclosure. The aspects, embodiments, and configurations are directed generally to analyzing a biomass feed material before combustion to improve plant operation.

A feed material can include:
a carbonaceous feed material to be combusted to generate an off-gas; and
an identifier, the identifier being associated with a predetermined composition, characteristic or property of the feed material or the off-gas.

A haulage vehicle can include:
a carbonaceous feed material to be combusted to generate an off-gas; and
an identifier, the identifier being associated with a predetermined composition, characteristic or property of the feed material or the off-gas.

The "tag" can be a low cost sensor such as a radio-frequency identification (RFID), or a chemical tag, a bar code, or similar types of identifiers. The sensor's identifier can be associated with the desired information pertaining to the coal batch. The tag can capture information including, without limitation or exclusion, the location that the coal was sourced, the coal characteristics (e.g., heating value, mercury, sulfur, chlorine or other halogens, etc.), information on when the coal was mined, the coal seam at a mine (or segment thereof), etc.

The haulage vehicle can be one or more of a barge, rail car, trailer, and truck.

The identifier can be adhered to a particle of the carbonaceous feed material, intermixed with the carbonaceous feed material, or attached to a surface of the haulage vehicle.

A method can include:
receiving a portion of carbonaceous material;
determining one or more of a composition, characteristic or property of the portion of the carbonaceous material;
determining, by a microprocessor, an identifier to associate with one or more of a composition, characteristic or property of the portion of the carbonaceous material; and
associating the identifier with the composition, characteristic or property of the portion of the carbonaceous material.

A method, comprising:
receiving first and second portions of carbonaceous material, each of the first and second portions having a corresponding first or second identifier, the corresponding first or second identifier being associated with one or more of a determined composition, characteristic or property of the corresponding first or second portion or an off-gas produced from combustion of the respective first or second portion, the first and second identifiers being different from one another;
based on the corresponding identifier, determining, by a microprocessor, the one or more of a determined composition, characteristic or property of each of the first and second portions; and
selecting a treatment to be applied to the off-gas based on the determined predetermined composition, characteristic or property of each of the first and second portions.

The one or more of a determined composition, characteristic or property can be one or more of a halogen, sulfur, calcium, ash, uranium, thorium, nitrogen, mercury, carbon, hydrogen, oxygen, arsenic, selenium, heavy metals, or other environmentally controlled substance or material that when combusted yields an environmentally controlled substance or a concentration thereof.

The one or more of a determined composition, characteristic or property can be one or more of heating value, melting point, moisture, volatile content, fixed carbon, density, or rank of the carbonaceous material.

The selected treatment can be selecting one or more of an additive composition, an amount of additive to be introduced to the carbonaceous material before combustion or to the off-gas, a rate of additive introduction to the carbonaceous material before combustion or to the off-gas, a third portion of carbonaceous feed material to be blended with the first or second portion, and a setting of a plant combusting the first or second portion.

The identifier can comprise information about the determined composition, characteristic or property of the corresponding portion or the off-gas. In that event, the determining can be performed by a handheld reader.

The identifier can exclude information about the determined composition, characteristic or property of the corresponding first or second portion or an off-gas but is stored in a computer readable medium in association with the identifier. The determining can therefore be performed by sending a query to an electronic address of a database server requesting the one or more of a determined composition, characteristic or property corresponding to the first or second identifier and, in response to the query, receiving, at an electronic address of a plant server, the one or more of a determined composition, characteristic or property corresponding to the first or second identifier.

The present disclosure can provide a number of advantages depending on the particular configuration. Knowing from the identifier the composition(s) or characteristic(s) or property(ies) of the various batches or off-gas produced therefrom can not only substantially optimize plant operation and off-gas purity but also simplify blend analysis or understanding what blending options exist within a specified schedule and how these options impact feed quality and plant operation. This knowledge can enable mathematical optimization algorithms and mathematical models of the physical blending problem to operate more effectively and reliably, thereby decreasing the need for manual adjustments to blends to achieve practical/desirable plant operation outcomes. The tag can be at a low enough cost that the "tag" could be introduced to the furnace with the coal. This can provide a cost efficient solution to the ability to characterize a combination of coal blended within a pile. As the coal is moved around in the coal pile, the "tag" could be utilized to determine the source of the coal being fired, and the associated characteristics (heating value, mercury, sulfur, chlorine, etc.).

These and other advantages will be apparent from the disclosure of the aspects, embodiments, and configurations contained herein.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces) or chemisorption (characteristic of covalent bonding). It may also occur due to electrostatic attraction.

"Ash" refers to the residue remaining after complete combustion of the coal particles. Ash typically includes mineral matter (silica, alumina, iron oxide, etc.).

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including miscanthus, switchgrass, hemp, corn, poplar, willow, sorghum, sugarcane, and a variety of tree species, ranging from eucalyptus to oil palm (or palm oil).

"Carbonaceous" refers to any organic material comprising carbon.

"Coal" refers to a combustible material formed from prehistoric plant life. Coal includes, without limitation, peat, lignite, sub-bituminous coal, bituminous coal, steam coal, waste coal, anthracite, and graphite. Chemically, coal is a macromolecular network comprised of groups of polynuclear aromatic rings, to which are attached subordinate rings connected by oxygen, sulfur, and aliphatic bridges.

"Composition" refers not only to the presence of substances, such as halogens, but also or alternatively to the atomic, molar, or weight ratios of selected components and/or amounts of the selected components present in a selected material.

The term "computer-readable medium" as used herein refers to any computer-readable storage and/or transmission medium that participate in providing instructions to a processor for execution. Such a computer-readable medium can be tangible, non-transitory, and non-transient and take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A "computer readable storage medium" may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any computer readable medium that is not a computer readable storage medium and that can communicate, propagate, or transport a program for use by or in connection with an instruction execution system, apparatus, or device. A computer readable signal medium may convey a propagated data signal with computer readable program code embodied therein, for example, in baseband or as part of a carrier wave. Such a propagated signal may take any of a variety of forms, including, but not limited to, electromagnetic, optical, or any suitable combination thereof. Program code embodied on a computer readable signal medium may be transmitted using any appropriate medium, including but not limited to wireless, wireline, optical fiber cable, RF, etc., or any suitable combination of the foregoing.

The term "database" or "data model" as used herein refers to any system, hardware, software, memory, storage device, firmware, component, etc., that stores data. The data model can be any type of database or storage framework, which is stored on any type of non-transitory, tangible computer readable medium. The data model can include one or more data structures, which may comprise one or more sections that store an item of data. A section may include, depending on the type of data structure, an attribute of an object, a data field, or other types of sections included in one or more types of data structures. The data model can represent any type of database, for example, relational databases, flat file databases, object-oriented databases, or other types of databases. Further, the data structures can be stored in memory or memory structures that may be used in either run-time applications or in initializing a communication.

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

"Halogen" refers to an electronegative element of group VIIA of the periodic table (e.g., fluorine, chlorine, bromine, iodine, astatine, listed in order of their activity with fluorine being the most active of all chemical elements).

"Halide" refers to a binary compound of the halogens.

"High alkali coals" refer to coals having a total alkali (e.g., calcium) content of at least about 20 wt. % (dry basis of the ash), typically expressed as CaO, while "low alkali coals" refer to coals having a total alkali content of less than 20 wt. % and more typically less than about 15 wt. % alkali (dry basis of the ash), typically expressed as CaO.

"High iron coals" refer to coals having a total iron content of at least about 10 wt. % (dry basis of the ash), typically expressed as $Fe_2O_3$, while "low iron coals" refer to coals having a total iron content of less than about 10 wt. % (dry basis of the ash), typically expressed as $Fe_2O_3$. As will be appreciated, iron and sulfur are typically present in coal in the form of ferrous or ferric carbonates and/or sulfides, such as iron pyrite.

"High sulfur coals" refer to coals having a total sulfur content of at least about 3 wt. % (dry basis of the coal) while "medium sulfur coals" refer to coals having between about 1.5 and 3 wt. % (dry basis of the coal) and "low sulfur coals" refer to coals having a total sulfur content of less than about 1.5 wt. % (dry basis of the coal).

The term "in communication with" as used herein refers to any coupling, connection, or interaction using electrical signals to exchange information or data, using any system, hardware, software, protocol, or format.

The term "module" as used herein refers to any known or later developed hardware, software, firmware, artificial intelligence, fuzzy logic, or combination of hardware and software that is capable of performing the functionality associated with that element.

The term "network" as used herein refers to a system used by one or more user devices to communicate. The network can consist of one or more session managers, feature servers, communication endpoints, etc. that allow communications, whether voice or data, between two user devices. Generally, a network can be a local area network (LAN), a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

"Particulate" refers to fine particles, such as fly ash, unburned carbon, contaminate-carrying powdered activated carbon, soot, byproducts of contaminant removal, excess solid additives, and other fine process solids, typically entrained in a mercury-containing gas stream.

"Means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

"Separating" and cognates thereof refer to setting apart, keeping apart, sorting, removing from a mixture or combination, or isolating. In the context of gas mixtures, separating can be done by many techniques, including electrostatic precipitators, baghouses, scrubbers, and heat exchange surfaces.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

It should be understood that the diagrams are provided for example purposes only, and should not be read as limiting the scope of the disclosure. Many other configurations, including multiple sorbent injection points and/or use of multiple static mixers, are fully contemplated and included in the scope of the disclosure.

DETAILED DESCRIPTION

Overview

A carbonaceous feed material is to be combusted to generate an off-gas or waste gas. An identifier, that is associated with a predetermined composition, characteristic or property of the feed material or the off-gas generated therefrom, is associated logically and/or physically with the carbonaceous feed material. The identifier can be in the form of a tag, serial number or other identifier of a haulage vehicle transporting the carbonaceous feed material, or other tangible form. The characteristic or property of the feed material or the off-gas generated therefrom can be determined directly from the identifier without a data lookup in a database or indirectly from the identifier with a data lookup in a database.

Figure 1:
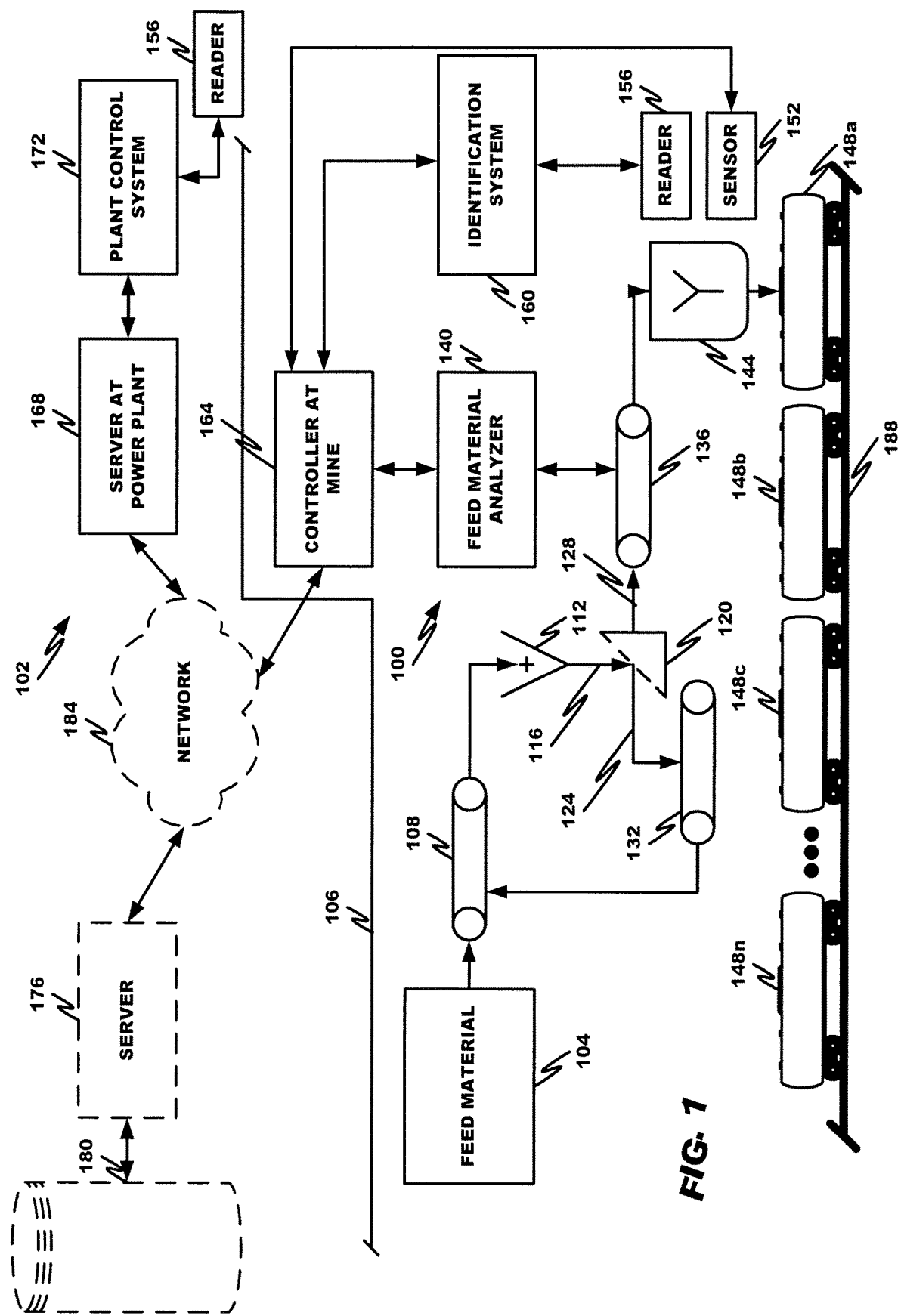
FIG. 1 is a block diagram according to a first embodiment of the disclosure.
Figure 2:
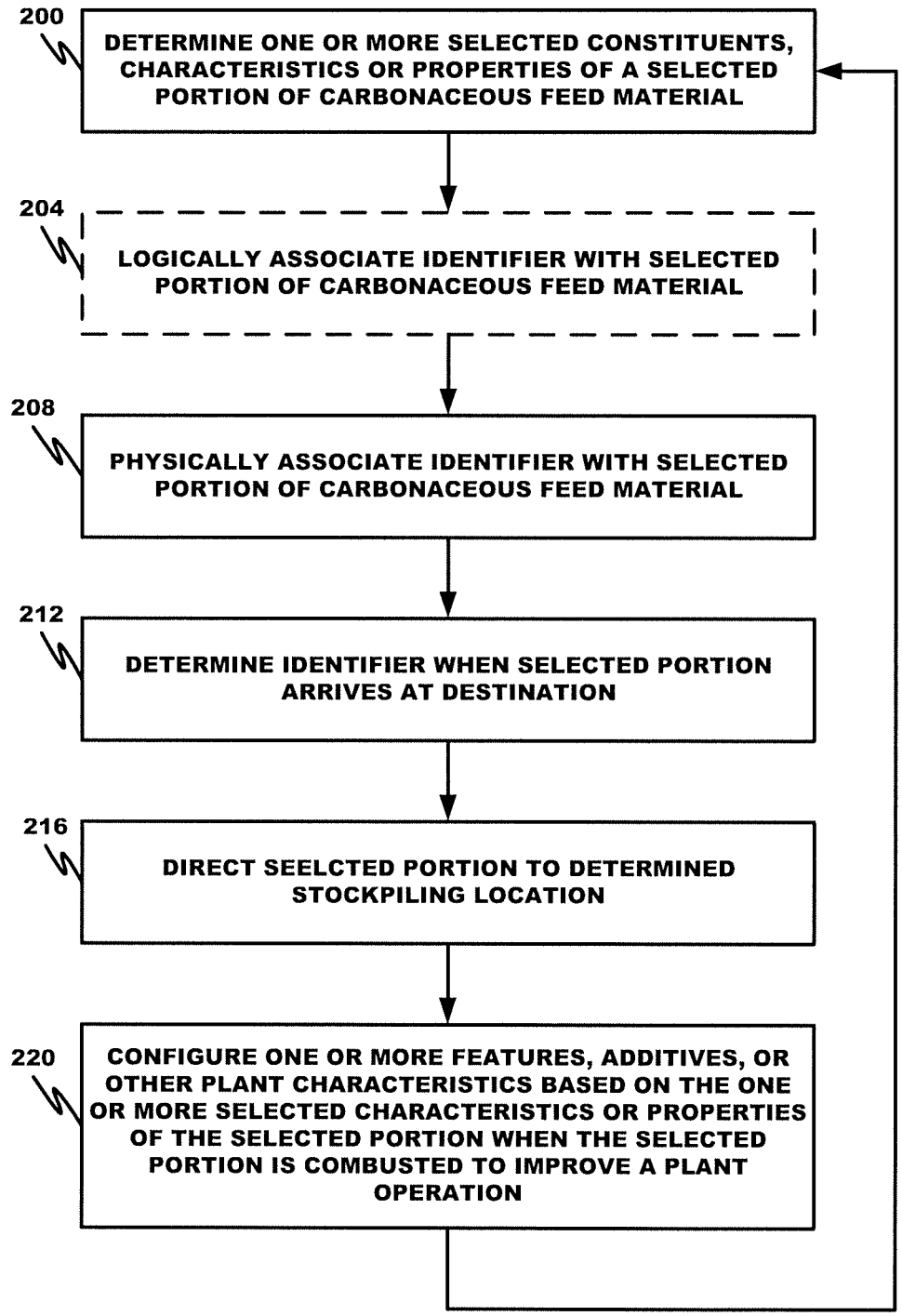
FIG. 2 is a flow diagram of an embodiment of a process according to this disclosure.

With reference to FIG. 1, as shown by spatial border 106, the coal management system comprises various components at spatially dislocated first and second locations 100 and 102, respectively. The first location 100 is typically a mine site, coal stockpiling site, or intermediate location such as a transloading facility. As will be appreciated, "transloading" is the process of transferring a shipment from one mode of transportation, such as rail car, to another, such as a semi-trailer or other haulage truck. The second location 102 is typically an industrial plant, such as a coal-fired power utility or plant or other contaminant evolving facility, such as smelters, autoclaves, roasters, steel foundries, steel mills, cement kilns, power plants, waste incinerators, boilers, and other contaminated gas stream producing industrial facilities.

First Location

The components at the first spatial location 100 include a first conveyance 108 to transport a carbonaceous feed material 104, a comminution device 112 to comminute the carbonaceous feed material 104 to form a comminuted feed material 116, a screen or grizzly 120 to separate the comminuted feed material 116 into oversized and undersized fractions 124 and 128, respectively, a second conveyance 132 to transport, or recycle, the oversized fraction 124 to the first conveyance 108, a third conveyance 136 to transport the undersized fraction 128, a feed material analyzer 140 to analyze or receive a composition (e.g., constituent) or characteristic of the undersized fraction 128, a hopper 144 for loading the undersized fraction 128 onto a selected one of the haulage vehicles 148a-n, a sensor 152 to determine when transition or switch is made from one haulage vehicle 148 to another, a reader 156 to sense or determine an identifier associated with the currently loading haulage vehicle 148 or loaded portion of the undersized fraction, an identification system 160 to determine an identifier for each haulage vehicle 148 or loaded portion of undersized fraction 128, and a controller 164 to associate the determined composition or characteristic of the loaded or otherwise selected portion of the undersized fraction 128 (also referred to herein as "batch") with an identifier of a haulage vehicle 148 into which it is loaded.

The carbonaceous feed material 104 can be any biomass, with coal being exemplary. The size of the portion of the undersized fraction can vary. In some applications, it is as small as a load in a rail car or dump truck and in other applications it is scaled to many times this size.

The first, second, and third conveyances 108, 132, and 136 can be any suitable conveyance mechanism, including conveyor system (e.g., gravity, Gravity skatewheel, belt, wire mesh, bucket, lineshaft, chain, or belt driven roller, chain, pneumatic, vibrating, flexible, vertical, spiral, screw, dust proof, or heavy duty rear conveyors), slurry pipeline, electric track vehicle system, and the other material handling system.

The comminution device 112 can be any comminuting system, including one or more wet or dry crushers, grinders, mills, or other comminuting devices.

The screen 120 can be any material size separating device, such as a grizzly screen, vibrating screen, trammel screen or other mechanical screening system, filter, and the like.

The feed material analyzer 140 can be any automated system for determining a composition(s) or characteristic(s) or property(ies) of a biomass granular material, such as coal, or an off-gas generated by combustion of the material or for receiving from human technicians determined composition(s) or characteristic(s) or property(ies) of the biomass granular material or off-gas generated by combustion of the material. The composition can be, for example, a halogen, sulfur, calcium, ash, uranium, thorium, nitrogen, mercury, carbon, hydrogen, oxygen, arsenic, selenium, heavy metals, or other environmentally controlled substance or material that when combusted yields an environmentally controlled substance or a concentration thereof. The characteristic can be, for example, heating value, melting point, moisture, volatile content, fixed carbon, density, and rank.

Biomass content analysis can be done by any chemical, mineralogical, or other technique designed to measure the particular compositions of the carbonaceous material, including laboratory testing and in-line sensors, such as X-ray diffraction, optical analysis, image processing, electro-optic detectors, electromagnetic sensors (such as a magnetic field sensor), electrostatic sensors, X-ray fluorescence analysis (in which a sample is bombarded with X rays and gives off fluorescent X-radiation of wavelengths characteristic of its elements, with the amount of emitted X-radiation being related to the concentration of individual elements in the sample), radioactive detector, emission spectroscopy (in which an electric discharge is established between a pair of electrodes that vaporizes a portion of the sample and excites the elements in the sample to emit characteristic spectra followed by detection and measurement of the wavelengths and intensities of the emission spectra to reveal the identities and concentrations of the elements in the sample), microscopic analysis, and/or mineralogical analysis (in which a single-sized fraction of a sample is suspended in a liquid of high specific gravity with particles of less density than the liquid floating and denser particles sinking—the components of the two fractions can then be determined by chemical analysis or by microscopic analysis of polished sections)

Biomass characteristic analysis can be done by any technique designed to measure the particular physical and chemical properties of the carbonaceous material. For example, moisture can be determined by heating the coal with toluene, drying in a minimum free-space oven at 150° C. (302° F.) within a nitrogen atmosphere, drying in air at 100 to 105° C. (212 to 221° F.) and relative loss of mass determined, or by an in-line moisture sensor. Volatile matter refers to the components of coal, except for moisture, which are liberated at high temperature in the absence of air. This is usually a mixture of short- and long-chain hydrocarbons, aromatic hydrocarbons and some sulfur. The volatile matter of coal is determined by heating the coal sample to 900±5° C. (1650±10° F.) for 7 min. Ash content of coal is the non-combustible residue left after coal is burnt. It represents the bulk mineral matter after carbon, oxygen, sulfur and water (including from clays) has been driven off during combustion. Analysis is done by burning the coal and the resulting ash material expressed as a percentage of the original weight. It can also give an indication about the quality or rank of coal. Ash content may be determined as air dried basis and on oven dried basis. The fixed carbon content of the coal is the carbon found in the material which is left after volatile materials are driven off. This differs from the ultimate carbon content of the coal because some carbon is lost in hydrocarbons with the volatiles. Fixed carbon can be determined by removing the mass of volatiles determined by the volatility test, above, from the original mass of the coal sample. Relative density or specific gravity of the coal depends on the rank of the coal and degree of mineral impurity. Relative density is normally determined by the loss of a sample's weight in water. Aside from physical or chemical analyses to determine the handling and pollutant profile of a coal, the energy output of a coal can be determined using a bomb calorimeter, which measures the specific energy output of a coal during complete combustion. Ash fusion temperatures can be determined by viewing a molded specimen of the coal ash through an observation window in a high-temperature furnace. The ash, in the form of a cone, pyramid or cube, is heated steadily past 1000° C. to as high a temperature as possible, preferably 1,600° C. (2,910° F.). The following temperatures are recorded: deformation temperature (which is reached when the corners of the mold first become rounded), softening (sphere) temperature (which is reached when the top of the mold takes on a spherical shape), hemisphere temperature (which is reached when the entire mold takes on a hemisphere shape), and flow (fluid) temperature (which is reached when the molten ash collapses to a flattened button on the furnace floor).

In any of the above techniques, many different sampling devices can be used for automated sampling, including shovels, pipe samplers, and automatic machine samplers.

Rather than using analytical information for the under-sized carbonaceous feed material, the feed material analyzer 140 can use average information previously determined for a mine or coal seam as the predetermined composition, characteristic or property of the feed material or the off-gas. The "tag" can be used to identify the source and fraction by source of blended coal in a pile. This information could be enhanced by correlating the "tag" with chemical analyses that are often conducted by day or by trainload from the mine, and other information associated with the coal or delivery, to get better accuracy.

The "tag" can monitor temperature, thereby indicating "hot-spots" on the coal pile that may need attention to prevent fires, for example. The temperature sensor could be very rudimentary (i.e. likely on fire, at risk, or not on fire).

The hopper 144 can be any loading mechanism, such as a hopper or any other system for dispensing granular materials.

The sensor 152 can be any suite of sensors that detect when a granular material starts to be dispensed by the hopper 144 and when the granular material is no longer or ceases to be dispensed by the hopper 144. It can also or alternatively determine an amount of granular material dispensed in the batch to a selected haulage vehicle 148. The sensor can be, for example, a sensor indicating when a door of the hopper is opened or closed, a motion sensor indicating movement of the haulage vehicle 148, a pressure sensor indicating a weight applied to a given section of track 188 or other roadway beneath or in proximity to the hopper 144, a magnetic sensor indicating when an iron containing object such as a wheel of a haulage vehicle is in proximity to the sensor, an image processing system to determine when a selected image of a haulage vehicle 148 or portion thereof is detected before or within a field of view of an imaging device, or a combination thereof.

The reader 156 optically, magnetically, or wirelessly via signaling senses an identifier associated with the haulage vehicle or undersized fraction ("undersized carbonaceous feed material") 128 loaded into the haulage vehicle. The identifier can be a substantially unique or derived (e.g., transcoded or algorithmically derived) from the sensed or determined levels or properties/characteristics of the associated portion or batch of the undersized carbonaceous feed material 128. In the former case, each portion of the batch of carbonaceous feed material and/or haulage vehicle has a unique identifier relative to other then existing portions or other batches of carbonaceous feed material or haulage vehicles. In this case, the identifier and associated characteristics/properties and/or compositions are commonly stored in a database and later looked up when the identifier is read at the destination plant. In the latter case, the identifiers are non-unique to all of the then-existing portions or batches of carbonaceous feed material but are unique as to a corresponding set of characteristics/properties and/or compositions. In this case, the corresponding set of characteristics/properties and/or compositions can be determined directly from the identifier when read at the destination plant. The identifier can be in the form of a tag applied to the corresponding haulage vehicle or included in the portion or batch of carbonaceous feed material carried by the haulage vehicle. The identifier can be a magnetically or optically sensed bar code, an active or passive radio-frequency identification (RFID) tag, a chemical tag, or similar identifiers.

The identifier can provide other information. For example, the identifier can indicate both the source or origin of and destination for the respective portion or batch of the carbonaceous feed material, the vein from which the coal was mined, etc.

When the identifier is configured as an RFID tag, the reader can be a two-way radio transmitter-receivers which sends a signal to the tag and reads the tag's response or a receiver that simply reads a signal transmitted at intervals by the tag. The RFID tag can be either passive, active or battery-assisted passive. An active tag has an on-board battery and periodically transmits its ID signal. A battery-assisted passive (BAP) has a small battery on board and is activated when in the presence of an RFID reader. A passive tag uses the radio energy transmitted by the reader.

The identifier tag may either be read-only, having a factory-assigned serial number that is used as a key into a database, or may be read/write, where object-specific data can be written into the tag by the system user. Field programmable tags may be write-once, read-multiple; "blank" tags may be written with an electronic product code by the user.

RFID tags commonly contain at least two parts: an integrated circuit for storing and processing information, modulating and demodulating a radio-frequency (RF) signal, collecting DC power from the incident reader signal, and other specialized functions; and an antenna for receiving and transmitting the signal. The tag information is generally stored in a non-volatile memory. The RFID tag can include either fixed or programmable logic for processing the transmission and sensor data, respectively.

An RFID reader commonly transmits an encoded radio signal to interrogate the tag. The RFID tag receives the message and then responds with its identification and other information. This may be only a unique tag serial number, or may be indicative of the characteristics/properties and/or compositions of the corresponding batch of carbonaceous feed material. Since tags have individual serial numbers, the RFID system design can discriminate among several tags that might be within the range of the RFID reader and read them simultaneously.

The identification system 160 optionally generates the identifier, based on the output of the feed material analyzer 140, and provides the generated identifier to the controller 164 for generation of a tag to be applied to the corresponding portion or batch of the carbonaceous feed material or haulage vehicle 148 or optionally receives the existing identifier from the reader and provides the identifier to the controller to be associated with the characteristics/properties and/or compositions of the corresponding portion of the carbonaceous feed material. The identification system can be any software-controlled computational device.

The controller 164 is a software-controlled computational device that receives the identifier and corresponding composition(s) or characteristic(s) or property(ies) of the selected portion of carbonaceous feed material and optionally forwards it via network to a server 176 and database 180 for storage and retrieval by the plant upon arrival of the haulage vehicle and sensing of the identifier by the plant operator.

The batch is transported by the haulage vehicles or any means to the coal-fired power plant or other intermediate or end use location. Upon its arrival at the intermediate or end use location, other batch compositions or characteristics can be identified, and the batch can be handled as necessary based on its compositions or characteristics.

While the mine site is discussed with specific reference to one configuration, it is to be understood that innumerable other configurations are possible. Moreover, while FIG. 1 discloses the feed material analyzer 140, identification system 160, reader 156, and controller 164 at the mine site, it is to be understood that it can be located at any other intermediate location between the mine and plant sites. For example, the carbonaceous feed material can be tagged with the identifier not only at the mine but also upon loading into rail/barge/truck or in transit or during unloading at an intermediate or end use location. The end use location is at or near the coal pile of a coal fired power plant.

Second Location

The components at the second spatial location 102 include the coal-fired power utility or plant and associated undersized carbonaceous feed material unloading, stockpiling, and feeding equipment and flue gas additive and waste gas treatment system (not shown), plant control system 172 to monitor and control plant operations, server 168, and reader 156.

The plant control system 172 can be any software-controlled computer that receives input from human operators or from the reader 156 and server 168, provides appropriate plant configuration and/or additive type(s) and amount(s) to be added for substantially optimal combustion of the portion of carbonaceous feed material corresponding to the sensed identifier. The composition(s) or characteristic(s) or property(ies) of the portion of carbonaceous feed material or off-gas produced from combustion of the portion of carbonaceous feed material can also or alternatively be used to realize substantially optimal plant performance, either by screening and sorting the coal to be combusted, or by tuning or adjusting equipment to perform optimally based on the content and characteristics of the batch, or by blending different portions of the carbonaceous feed material to yield desired feed material composition(s) or characteristic(s) or property(ies) for the particular plant configuration. Coal blending of different batches of carbonaceous feed material can achieve selected attributes that are desirable for the coal's intended application. The quality attributes that are often important in blending include ash, volatile matter, total Sulfur, and gross calorific value.

The information associated with the identifier can be used in a number of ways by the plant operator. For example, if batch moisture content were included in the indexed information it could allow an indication of impacts to plant heat rate (i.e. how much additional energy is required to dry the coal before firing). Mercury or sulfur content of the batch could be integrated with a plant operations model to predict mercury emissions (or emissions of one or more acid gases (e.g., sulfur-containing compounds (such as sulfur dioxide and trioxide produced by thermal oxidation of sulfides), nitrogen oxides (such as nitrogen monoxide and dioxide), hydrogen sulfide ($H_2S$), hydrochloric acid (HCl), and hydrofluoric acid (HF)), mercury (elemental and/or oxidized forms), carbon oxides (such as carbon monoxide and dioxide), halogens and halides, particulates (e.g., fly ash particles and other types of unburned carbon), and the like). Although the contaminant is typically evolved by combustion, it may be evolved by other oxidizing reactions, reducing reactions, and other thermal processes such as roasting, pyrolysis, and autoclaving, that expose contaminated materials to elevated temperatures or other pollutant emissions) at the stack of the plant. Information on calcium content of the batch or other ash characteristics of the batch could be used to model impacts on operation of the particulate collector or opacity, and could be used to control flue gas conditioning usage. Information could be used to guide coal handling (i.e. a location sensor on the loader could be correlated to the coal sensors in the pile to better control sulfur levels and associated sulfur emissions, chlorine levels and associated chlorine emissions, Hg levels and associated Hg emissions, etc. from blended coal. The ability to manage the coal pile to better control emissions could allow a plant to save significant money by being less stringent on fuel quality requirements because they could actively blend coal or optimize plant equipment in near real-time.

A portable or handheld scanning or reading computational device can be used by personnel of the plant operator to scan the identifier associated with each batch of carbonaceous feed material and provide, in real time, displayed output of the predetermined composition, characteristic or property of the feed material or the off-gas. This can enable plant personnel to direct the corresponding batch of carbonaceous material to an appropriate stockpiling location for blending or input to the plant.

The server 168 is a software-controlled computational device that provides functionality for other programs or devices, called "clients" in a local area network for the plant. The server can provide various functionalities, often called "services", such as sharing data or resources among multiple clients, or performing computation for a client.

Optional Database

The architecture can include a database 180 and associated database server 176 interconnected with the controller at the mine and power plant server by an optional wide area network 184.

The server 176 and associated database 180 can be located at any location, including the first or second locations 100 or 102.

The servers 176 and 168 and controller 164 are interconnected by a network 184.

The database can provide a centralized store of identifiers for batches of multiple mines and associated identifiers for access by servers at multiple power plants. In this way, power plants buying feed material from multiple mines can have one centralized storage location and universal set of data structures for all mines, whether run by the same or different operators. As will be appreciated, using different identifier structures can create many problems for the plant operator. A typical data structure in the database 180 could include the identifier, associated batch composition(s), characteristic(s) and property(ies) or composition(s), characteristic(s) and property(ies) of an off-gas generated by combustion of the material, mine operator, mine location, seam from which the coal was mined, shipping date, shipping carrier, current shipment or batch location, expected arrival date at destination, and the like.

Exemplary Process Configuration

In step 200, the feed material analyzer 140 determines one or more compositions, characteristics, or properties (or determined information) of a batch of undersized carbonaceous feed material 128.

In optional step 204, the determined information is associated with an identifier, which is in turn associated with the portion of the carbonaceous feed material. In other embodiments, the identifier is generated from the determined information, such that knowing the identifier, and nothing more, enables the plant operator to ascertain the underlying determined information.

In step 208, the identifier is physically associated with the selected portion of the carbonaceous feed material. This can be done by locating the identifier on the haulage vehicle, attaching the identifier to a particle of coal, or simply placing the identifier in the batch of coal.

In step 212, the identifier is determined when the selected portion of the carbonaceous feed material arrives at a destination, such as a plant, and the determined information is derived directly from the identifier or indirectly from a database search or lookup based on the identifier.

In step 216, the selected portion of the carbonaceous feed material is directed to a stockpiling location based on the determined information.

In step 220, the plant control system configures one or more features, additives, or other plant characteristics based on the one or more selected compositions, characteristics, or properties of the selected portion of the carbonaceous feed material when the selected portion is to be combusted, to improve a plant operation.

Computational Device Configurations

Figure 3:
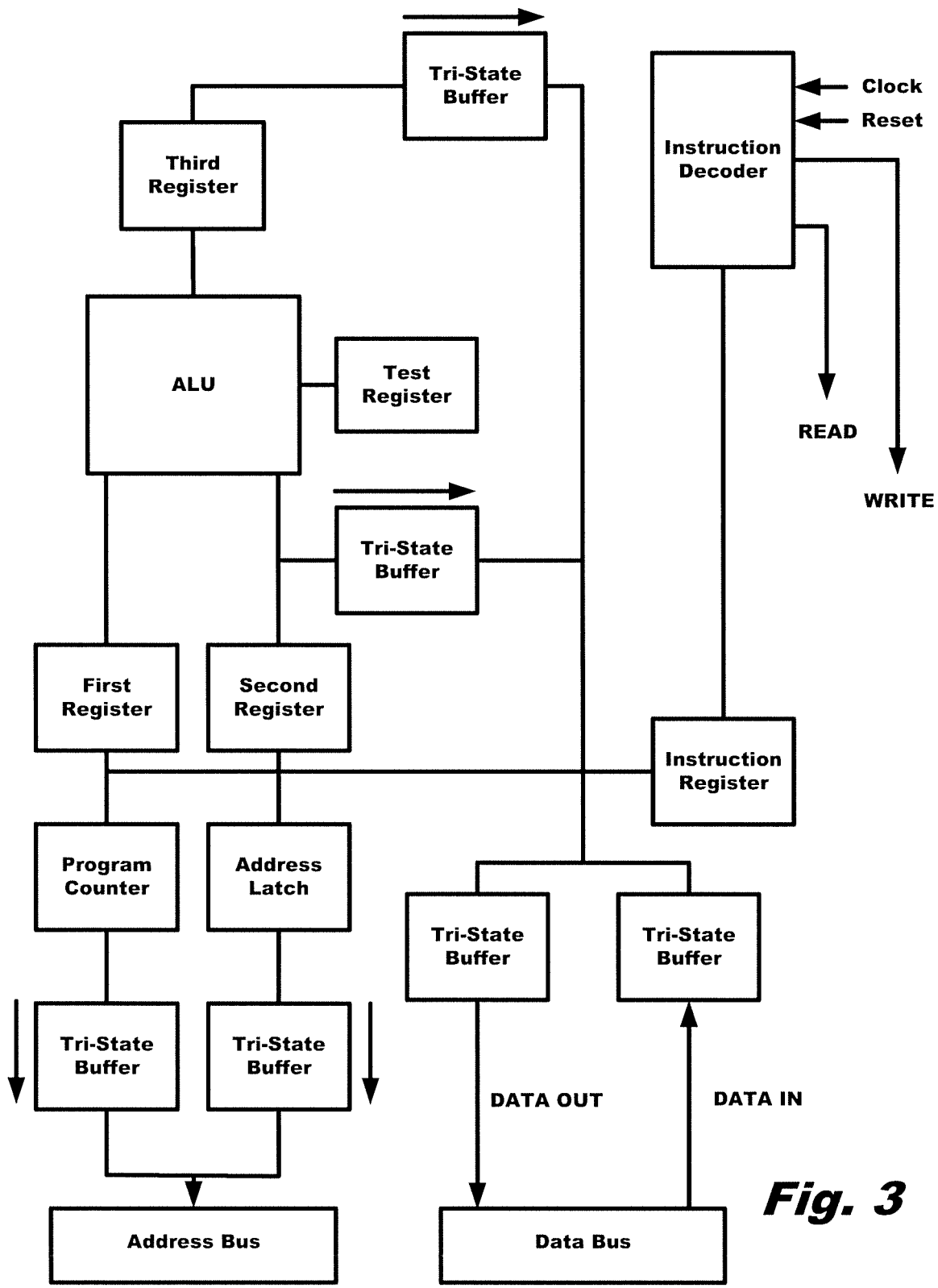
FIG. 3 is a block diagram of hardware for the verification system according to an embodiment.

With reference to FIG. 3, the configurations and mathematical processing operations of each of the feed material analyzer 140, identification system 160, controller 164, power plant server 168, plant control system 172, and database server 176. Each of the components generates commands or other output, such as the identifier, using an arithmetic/logic unit ("ALU"), which performs mathematical operations, such as addition, subtraction, multiplication, and division, machine instructions, an address bus (that sends an address to memory), a data bus (that can send data to memory or receive data from memory), a read and write line to tell the memory whether to set or get the addressed location, a clock line that enables a clock pulse to sequence the processor, and a reset line that resets the program counter to zero or another value and restarts execution. The arithmetic/logic unit can be a floating point processor that performs operations on floating point numbers. The verification system further includes first, second, and third registers that are typically configured from flip-flops, an address latch, a program counter (which can increment by "1" and reset to "0"), a test register to hold values from comparisons performed in the arithmetic/logic unit, plural tri-state buffers to pass a "1" or "0" or disconnect its output (thereby allowing multiple outputs to connect to a wire but only one of them to actually drive a "1" or "0" into the line), and an instruction register and decoder to control other components. Control lines from the instruction decoder can: command the first register to latch the value currently on the data bus, command the second register to latch the value currently on the data bus, command the third register to latch the value currently output by the ALU, command the program counter register to latch the value currently on the data bus, command the address register to latch the value currently on the data bus, command the instruction register to latch the value currently on the data bus, command the program counter to increment, command the program counter to reset to zero, activate any of the plural tri-state buffers (plural separate lines), command the ALU what operation to perform, command the test register to latch the ALU's test bits, activate the read line, and activate the write line. Bits from the test register and clock line as well as the bits from the instruction register come into the instruction decoder. Hardware similar or identical to that of FIG. 3 is in each of the components identified above. The ALU executes instructions to generate the identifier using the appropriate seed values, such as the determined information.

For example, the identifier is generated by the ALU executing algorithm instructions received from the local memory and is written to local memory, in response to a write command output by the instruction decoder, and at an address provided to memory by the ALU via the program counter and/or address latch via the address bus, with the data being provided to local memory via the data bus. The identifier is also provided or transmitted to the server by the ALU over the network in accordance to a suitable suite of protocols, such as TCP/IP.

Comparison of a sensed identifier with stored identifiers can be done using the ALU and test register. The ALU normally compares first and selected numbers and determines if they are equal, if one is greater than the other, or if one is less than the other. The test register can hold a carry bit from the last stage of the adder. The test register stores these carry bit values in flip-flops and then the instruction decoder can use the values to make decisions. The ALU sequentially and independently compares first (received) and second (stored) values to sequentially and independently confirm that the first and second values are identical and therefore that the stored identifier is the same as the sensed identifier from a batch of carbonaceous feed material. When the first value is greater than the second value or less than the second value, the search is not successful. When a comparison is performed by the ALU, the carry bit indicates whether or not the comparison matched.

The second values are read from local memory by a read command issued by the instruction decoder, with the read data being located at an address provided to the local memory by the address bus and output by the ALU and program counter and/or address latch, with the read data being received from local memory via the data bus.

When the search fails, the ALU denies the request for determined information and records the transaction details and result, in response to a write command issued by the instruction decoder at a memory address provided by the ALU via the program counter and/or address latch and provided to local memory via the address bus.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

I claim:

1. A system, comprising:
   a reader that scans a first identifier associated with a first portion of a carbonaceous material, the first identifier being associated with a predetermined composition, characteristic, or property of one or more of: (a) the first portion of the carbonaceous material and (b) an off-gas produced from combustion of the first portion of the carbonaceous material;
   a computer readable medium comprising a plurality of identifiers, including the first identifier associated with the first portion of the carbonaceous material, and, for each identifier of the plurality of identifiers, predetermined composition, characteristic, or property of one or more of: (a) a respective portion of the carbonaceous material and (b) an off-gas produced from combustion of the respective portion of the carbonaceous material;
   a server that receives, from the reader, the scanned first identifier associated with the first portion of the carbonaceous material and determines, from the computer readable medium, the predetermined composition, characteristic, or property of one or more of: (a) the first portion of the carbonaceous material and (b) the off-gas produced from combustion of the first portion of the carbonaceous material; and
   a computer-controlled plant controller that:
      receives, from the server, the associated predetermined composition, characteristic, or property of one or more of: (a) the first portion of the carbonaceous material and (b) the off-gas produced from combustion of the first portion of the carbonaceous material; and
      selects a treatment to be applied to the off-gas produced by combustion of the first portion of the carbonaceous material based on the predetermined composition, characteristic, or property of one or more of: (a) the first portion of the carbonaceous material and (b) the off-gas produced from combustion of the first portion of the carbonaceous material to reduce emission of an environmentally controlled substance derived from combustion of the first portion of the carbonaceous material.

2. The system of claim 1, wherein the reader optically, magnetically, or wirelessly via signaling senses the first identifier associated with the first portion of the carbonaceous material, wherein the first identifier associated with the first portion of the carbonaceous material comprises one or more of a radio-frequency identification (RFID) tag, a chemical tag, and a bar code, wherein the plurality of identifiers correspond to differing predetermined compositions, characteristics, or properties of one or more of: (a) the respective portion of the carbonaceous material and (b) the off-gas produced from combustion of the respective portion of the carbonaceous material.

3. The system of claim 2, wherein each of the plurality of identifiers are different from one another and wherein the differing predetermined compositions, characteristics, or properties of one or more of: (a) the respective portion of the carbonaceous material and (b) the off-gas produced from combustion of the respective portion of the carbonaceous material are each derived from average information previously determined for a mine or a coal seam that is a source of the respective portion of the carbonaceous material, and wherein each of the plurality of identifiers identifies the respective portion of the carbonaceous material by source of blended coal in a pile.

4. The system of claim 2, wherein each of the plurality of identifiers are different from one another and wherein the differing predetermined compositions, characteristics, or properties of one or more of: (a) the respective portion of the carbonaceous material and (b) the off-gas produced from combustion of the respective portion of the carbonaceous material comprises differing predetermined compositions, characteristics, or properties of the respective portion of the carbonaceous material.

5. The system of claim 2, wherein each of the plurality of identifiers are different from one another and wherein the differing predetermined compositions, characteristics, or properties of one or more of: (a) the respective portion of the carbonaceous material and (b) the off-gas produced from combustion of the respective portion of the carbonaceous material comprises differing predetermined compositions, characteristics, or properties of the off-gas produced from combustion of the respective portion of the carbonaceous material.

6. The system of claim 1, wherein the predetermined composition, characteristic, or property relates to one or more of uranium, thorium, sulfur, nitrogen, mercury, arsenic, selenium, and a heavy metal, and wherein each of the plurality of identifiers is one or more of a radio frequency identifier ("RFID"), bar code, and chemical marker, wherein each of the plurality of identifier identifies a source or a fraction by source of blended coal in a pile and wherein the selected treatment comprises adding an amount of an additive to alter the predetermined composition, characteristic, or property of the off-gas produced from combustion of the first portion of the carbonaceous material, and wherein the amount of the additive is based on the predetermined composition, characteristic, or property of the off-gas produced from combustion of the first portion of the carbonaceous material.

7. The system of claim 1, wherein the predetermined composition, characteristic, or property relates to one or more of uranium, thorium, sulfur, nitrogen, mercury, arsenic, selenium, and a heavy metal, wherein each of the plurality of identifiers is one or more of a radio frequency identifier ("RFID"), bar code, and chemical marker, wherein the predetermined composition, characteristic, or property of the off-gas produced from combustion of the first portion of the carbonaceous material is used to predict emission of the environmentally controlled substance or concentration thereof in the off-gas produced from combustion of the first portion of the carbonaceous material, and wherein an amount of an additive is based on the predetermined composition, characteristic, or property of the off-gas produced from combustion of the first portion of the carbonaceous material.

8. The system of claim 2, wherein the carbonaceous material is in a haulage vehicle, wherein the differing predetermined compositions, characteristics, or properties of one or more of: (a) the respective portion of the carbonaceous material and (b) the off-gas produced from combustion of the respective portion of the carbonaceous material comprises differing predetermined compositions, characteristics, or properties of the off-gas produced from combustion of the respective portion of the carbonaceous material, wherein each of the plurality of identifiers is non-unique to then-existing portions or batches of the carbonaceous material but are unique as to a corresponding composition, characteristic, or property, and wherein each of the plurality of identifiers is adhered to a particle of the carbonaceous material, intermixed with the carbonaceous material, or attached to a surface of the haulage vehicle.

9. The system of claim 1, wherein the first and a second identifier of the plurality of identifiers are different from one another, the second identifier being associated with a second portion of a carbonaceous material, the second identifier being associated with a predetermined composition, characteristic, or property of one or more of: (a) the second portion of the carbonaceous material and (b) an off-gas produced from combustion of the second portion of the carbonaceous material, wherein the differing predetermined compositions, characteristics, or properties of one or more of: (a) the respective portion of the carbonaceous material and (b) the off-gas produced from combustion of the respective portion of the carbonaceous material comprises differing predetermined compositions, characteristics, or properties of the off-gas produced from combustion of the respective portion of the carbonaceous material, wherein the predetermined composition, characteristic, or property of the off-gas produced from combustion of the respective first or second portion of the carbonaceous material and the corresponding first or second identifier are determined at a mine or a trans-loading facility located remotely from a destination plant location where the first and second portions are combusted to produce the off-gas, wherein the first and second portions of the carbonaceous material are in different haulage vehicles and have different identifiers, wherein the server queries a database comprising the computer readable medium, the query requesting the predetermined composition, characteristic, or property corresponding to the first or second identifier and, in response to the query, receives the predetermined composition, characteristic, or property corresponding to the first or second identifier.

10. The system of claim 1, wherein the first and a second identifier of the plurality of identifiers are different from one another, the second identifier being associated with a second portion of a carbonaceous material, the second identifier being associated with a predetermined composition, characteristic, or property of one or more of: (a) the second portion of the carbonaceous material and (b) an off-gas produced from combustion of the second portion of the carbonaceous material, wherein the differing predetermined compositions, characteristics, or properties of one or more of: (a) the respective portion of the carbonaceous material and (b) the off-gas produced from combustion of the respective portion of the carbonaceous material comprises differing predetermined compositions, characteristics, or properties of the off-gas produced from combustion of the respective portion of the carbonaceous material, wherein the predetermined composition, characteristic, or property of the off gas produced from combustion of the respective portion of the carbonaceous material is related to one or more of a halogen, sulfur, uranium, thorium, nitrogen, mercury, arsenic, selenium, heavy metal, and another environmentally controlled substance or a material or a concentration thereof, and wherein the selected treatment to be applied to the off-gas is selecting one or more of an additive composition, an amount of additive to be introduced to the carbonaceous material before combustion or to the off-gas, a rate of additive introduction to the carbonaceous material before combustion or to the off-gas, a third portion of carbonaceous material to be blended with the first or second portion of the carbonaceous material, and a setting of a plant combusting the first or a second portion of the carbonaceous material.

11. The system of claim 2, wherein the first and a second identifier of the plurality of identifiers are different from one another, the second identifier being associated with a second portion of a carbonaceous material, the second identifier being associated with a predetermined composition, characteristic, or property of one or more of: (a) the second portion of the carbonaceous material and (b) an off-gas produced from combustion of the second portion of the carbonaceous material, wherein the differing predetermined compositions, characteristics, or properties of one or more of: (a) the respective portion of the carbonaceous material and (b) the off-gas produced from combustion of the respective portion of the carbonaceous material comprises differing predetermined compositions, characteristics or properties of the off-gas produced from combustion of the respective portion of the carbonaceous material, wherein the predetermined composition, characteristic, or property of the off-gas produced from combustion of the respective first or second portion of the carbonaceous material and the corresponding first or second identifier are determined at a mine or a trans-loading facility located remotely from a destination plant location where the first portion and the second portion of the carbonaceous material are combusted to produce the off-gas.

12. A system, comprising:
a reader that scans a first identifier associated with a first portion of a carbonaceous material, the first identifier being associated with a predetermined composition, characteristic, or property of one or more of: (a) the first portion of the carbonaceous material and (b) an off-gas produced from combustion of the first portion of the carbonaceous material;
a computer readable medium comprising a plurality of identifiers, including the first identifier associated with a first portion of a carbonaceous material, and, for each identifier, an associated predetermined composition, characteristic, or property of one or more of: (a) a respective portion of the carbonaceous material and (b) an off-gas produced from combustion of the respective portion of the carbonaceous material; and
a computer-controlled plant controller that:
receives, from the computer readable medium in response to receipt of the scanned first identifier associated with the first portion of the carbonaceous material from the reader, the predetermined composition, characteristic, or property of one or more of: (a) the first portion of the carbonaceous material and (b) the off-gas produced from combustion of the first portion of the carbonaceous material associated with the scanned first identifier associated with the first portion of the carbonaceous material; and
selects a treatment to be applied to the off-gas produced by combustion of the first portion based on the predetermined composition, characteristic, or property of one or more of: (a) the first portion of the carbonaceous material and (b) the off-gas produced from combustion of the first portion of the carbonaceous material to reduce emission of an environmentally controlled substance derived from combustion of the first portion of the carbonaceous material.

13. The system of claim 12, wherein the reader optically, magnetically, or wirelessly via signaling senses the first identifier associated with the first portion of the carbonaceous material, wherein the first identifier associated with the first portion of the carbonaceous material comprises one or more of a radio-frequency identification (RFID) tag, a chemical tag, and a bar code, wherein the plurality of identifiers correspond to differing predetermined compositions, characteristics, or properties of one or more of: (a) the respective portion of the carbonaceous material and (b) the off-gas produced from combustion of the respective portion of the carbonaceous material.

14. The system of claim 13, wherein each of the plurality of identifiers are different from one another and wherein the differing predetermined compositions, characteristics or properties of one or more of: (a) the respective portion of the carbonaceous material and (b) the off-gas produced from combustion of the respective portion of the carbonaceous material are each derived from average information previously determined for a mine or a coal seam that is a source of the respective portion of the carbonaceous material, and wherein each of the plurality of identifiers identifies the respective portion of the carbonaceous material by source of blended coal in a pile.

15. The system of claim 13, wherein each of the plurality of identifiers are different from one another and wherein the differing predetermined compositions, characteristics or properties of one or more of: (a) the respective portion of the carbonaceous material and (b) the off-gas produced from combustion of the respective portion of the carbonaceous material comprises differing predetermined compositions, characteristics or properties of the respective portion of the carbonaceous material.

16. The system of claim 13, wherein each of the plurality of identifiers are different from one another and wherein the differing predetermined compositions, characteristics or properties of one or more of: (a) the respective portion of the carbonaceous material and (b) the off-gas produced from combustion of the respective portion of the carbonaceous material comprises differing predetermined compositions, characteristics, or properties of the off-gas produced from combustion of the respective portion of the carbonaceous material.

17. The system of claim 12, wherein the predetermined composition, characteristic, or property relates to one or more of uranium, thorium, sulfur, nitrogen, mercury, arsenic, selenium, and a heavy metal, and wherein each of the plurality of identifiers is one or more of a radio frequency identifier ("RFID"), bar code, and chemical marker, and wherein each of the plurality of identifiers identifies a source or fraction by source of blended coal in a pile and wherein the selected treatment comprises adding an amount of an additive to alter the predetermined composition, characteristic, or property of the off-gas produced from combustion of the first portion of the carbonaceous material, and wherein the amount of the additive is based on the predetermined composition, characteristic, or property of the off-gas produced from combustion of the first portion of the carbonaceous material.

18. The system of claim 12, wherein the predetermined composition, characteristic, or property relates to one or more of uranium, thorium, sulfur, nitrogen, mercury, arsenic, selenium, and a heavy metal, wherein each of the plurality of identifiers is one or more of a radio frequency identifier ("RFID"), bar code, and chemical marker, wherein the predetermined composition, characteristic, or property of the off-gas produced from combustion of the first portion of the carbonaceous material is used to predict emission of the environmentally controlled substance or concentration thereof in the off-gas produced from combustion of the first portion of the carbonaceous material, and wherein an amount of an additive is based on the predetermined composition, characteristic, or property of the off-gas produced from combustion of the first portion of the carbonaceous material.

19. The system of claim 13, wherein the carbonaceous material is in a haulage vehicle, wherein the differing predetermined compositions, characteristics, or properties of one or more of: (a) the respective portion of the carbonaceous material and (b) the off-gas produced from combustion of the respective portion of the carbonaceous material comprises differing predetermined compositions, characteristics or properties of the off-gas produced from combustion of the respective portion of the carbonaceous material, wherein each of the plurality of identifiers is non-unique to then-existing portions or batches of the carbonaceous material but are unique as to a corresponding composition, characteristic, or property, and wherein each of the plurality of identifiers is adhered to a particle of the carbonaceous material, intermixed with the carbonaceous material, or attached to a surface of the haulage vehicle.

20. The system of claim 12, wherein the first and a second identifier of the plurality of identifiers are different from one another, the second identifier being associated with a second portion of a carbonaceous material, the second identifier being associated with a predetermined composition, characteristic, or property of one or more of: (a) the second portion of the carbonaceous material and (b) an off-gas produced from combustion of the second portion of the carbonaceous material, wherein the differing predetermined compositions, characteristics, or properties of one or more of: (a) the respective portion of the carbonaceous material and (b) the off-gas produced from combustion of the respective portion of the carbonaceous material comprises differing predetermined compositions, characteristics, or properties of the off-gas produced from combustion of the respective portion of the carbonaceous material, wherein the predetermined composition, characteristic, or property of the off-gas produced from combustion of the respective first or second portion of the carbonaceous material and the corresponding first or second identifier are determined at a mine or a trans-loading facility located remotely from a destination plant location where the first and second portions are combusted to produce the off-gas, wherein the first and second portions of the carbonaceous material are in different haulage vehicles and have different identifiers, wherein the server queries a database comprising the computer readable medium, the query requesting the predetermined composition, characteristic, or property corresponding to the first or second identifier and, in response to the query, receives the predetermined composition, characteristic, or property corresponding to the first or second identifier.

21. The system of claim 12, wherein the first and a second identifier of the plurality of identifiers are different from one another, the second identifier being associated with a second portion of a carbonaceous material, the second identifier being associated with a predetermined composition, characteristic, or property of one or more of: (a) the second portion of the carbonaceous material and (b) an off-gas produced from combustion of the second portion of the carbonaceous material, wherein the differing predetermined compositions, characteristics, or properties of one or more of: (a) the respective portion of the carbonaceous material and (b) the off-gas produced from combustion of the respective portion of the carbonaceous material comprises differing predetermined compositions, characteristics, or properties of the off-gas produced from combustion of the respective portion of the carbonaceous material, wherein the predetermined composition, characteristic, or property of the off gas is related to one or more of a halogen, sulfur, uranium, thorium, nitrogen, mercury, arsenic, selenium, heavy metal, and another environmentally controlled substance or a material or a concentration thereof, and wherein the selected treatment is selecting one or more of an additive composition, an amount of additive to be introduced to the carbonaceous material before combustion or to the off-gas, a rate of additive introduction to the carbonaceous material before combustion or to the off-gas, a third portion of carbonaceous material to be blended with the first or second portion of the carbonaceous material, and a setting of a plant combusting the first or a second portion of the carbonaceous material.

22. The system of claim 12, wherein the first and a second identifier of the plurality of identifiers are different from one another, the second identifier being associated with a second portion of a carbonaceous material, the second identifier being associated with a predetermined composition, characteristic, or property of one or more of: (a) the second portion of the carbonaceous material and (b) an off-gas produced from combustion of the second portion of the carbonaceous material, wherein the differing predetermined compositions, characteristics, or properties of one or more of: (a) the respective portion of the carbonaceous material and (b) the off-gas produced from combustion of the respective portion of the carbonaceous material comprises differing predetermined compositions, characteristics, or properties of the off-gas produced from combustion of the respective portion of the carbonaceous material, wherein the predetermined composition, characteristic, or property of the off-gas produced from combustion of the respective first or second portion of the carbonaceous material and the corresponding first or second identifier are determined at a mine or a trans-loading facility located remotely from a destination plant location where the first portion and the second portion of the carbonaceous material are combusted to produce the off-gas.

23. A system, comprising:
an automated feed material analyzer that determines, for a selected portion of a carbonaceous material, an associated one or more of a composition, characteristic, and property of one or more of: (a) the selected portion of the carbonaceous material and (b) an off-gas produced from combustion of the selected portion of the carbonaceous material;
an identification system that automatically generates an identifier associated with the selected portion of the carbonaceous material, the identifier being associated with the one or more of a predetermined composition, characteristic, and property of one or more of: (a) the selected portion of the carbonaceous material and (b) the off-gas produced from combustion of the selected portion of the carbonaceous material; and
a computer controller that receives the identifier and associated selected portion of the carbonaceous material, the identifier being associated with the one or more of the predetermined composition, characteristic, and property of one or more of: (a) the selected portion of the carbonaceous material and (b) the off-gas produced from combustion of the selected portion of the carbonaceous material and updates a computer readable medium comprising a plurality of identifiers to include the identifier and associated selected portion of the carbonaceous material, the identifier being associated with the one or more of the predetermined composition, characteristic, and property of one or more of: (a) the selected portion of the carbonaceous material and (b) the off-gas produced from combustion of the selected portion of the carbonaceous material;
a reader that scans the identifier, the identifier being associated, in the computer readable medium, with the selected portion of a carbonaceous material, the identifier being associated with one or more of the predetermined composition, characteristic, and property of one or more of: (a) the selected portion of the carbonaceous material and (b) the off-gas produced from combustion of the selected portion of the carbonaceous material;
a server that receives, from the reader, the scanned identifier and determines, from the computer readable medium, one or more of the predetermined composition, characteristic, and property of one or more of: (a) the selected portion of the carbonaceous material and (b) the off-gas produced from combustion of the selected portion of the carbonaceous material; and
a computer-controlled plant controller that receives, from the server, one or more of the predetermined composition, characteristic, and property of one or more of: (a) the selected portion of the carbonaceous material and (b) the off-gas produced from combustion of the selected portion of the carbonaceous material; and
selects a treatment to be applied to the off-gas produced by combustion of the selected portion based on one or more of the predetermined composition, characteristic, and property of one or more of: (a) the selected portion of the carbonaceous material and (b) the off-gas produced from combustion of the selected portion of the carbonaceous material to reduce emission of an environmentally controlled substance derived from combustion of the selected portion of the carbonaceous material.

24. The system of claim 23, wherein the reader optically, magnetically, or wirelessly via signaling senses the identifier, wherein the identifier comprises one or more of a radio-frequency identification (RFID) tag, a chemical tag, and a bar code, wherein the plurality of identifiers correspond to differing one or more predetermined compositions, characteristics, and properties of one or more of: (a) the selected portion of the carbonaceous material and (b) the off-gas produced from combustion of the selected portion of the carbonaceous material,
wherein each of the plurality of identifiers are different from one another and wherein the differing one or more of the predetermined compositions, characteristics, and properties of one or more of: (a) the selected portion of the carbonaceous material and (b) the off-gas produced from combustion of the selected portion of the carbonaceous material are each derived from average information previously determined for a mine or a coal seam that is a source of a selected portion of the carbonaceous material, and wherein the identifier identifies a respective source or fraction by source of blended coal in a pile.

* * * * *